United States Patent [19]

Goscenski, Jr.

[11] 4,189,919
[45] Feb. 26, 1980

[54] MOTOR-VALVE APPARATUS FOR HYDRAULIC FAN DRIVE SYSTEM

[75] Inventor: Edward J. Goscenski, Jr., Battle Creek, Mich.

[73] Assignee: Eaton Corporation, Cleveland, Ohio

[21] Appl. No.: 966,984

[22] Filed: Dec. 6, 1978

Related U.S. Application Data

[63] Continuation-in-part of Ser. No. 907,064, May 18, 1978.

[51] Int. Cl.² ............................................. F15B 11/16
[52] U.S. Cl. ........................................ 60/420; 60/456; 60/468; 60/484; 91/419; 123/41.12
[58] Field of Search .................. 60/329, 420, 456, 468, 60/484, DIG. 5; 91/419; 123/41.12, 41.49, 41.65

[56] References Cited

U.S. PATENT DOCUMENTS

| | | | |
|---|---|---|---|
| 2,777,287 | 1/1957 | Tweedale | 60/396 X |
| 2,948,268 | 8/1960 | Roper et al. | 123/41.11 |
| 3,055,473 | 9/1962 | Oldberg et al. | 192/58 A |
| 3,659,567 | 5/1972 | Murray | 123/41.12 |

*Primary Examiner*—Edgar W. Geoghegan
*Attorney, Agent, or Firm*—R. J. McCloskey; L. Kasper; J. Yakimow

[57] ABSTRACT

A vehicle engine accessory drive system is disclosed including a hydraulic fan motor (41) and a power steering gear mechanism SG in series flow relationship. The vehicle power steering pump P is the sole source of fluid for the system and has its flow control setting at a flow rate X, which is substantially greater than the flow rate Z required by the power steering gear SG. The motor-valve apparatus includes a valve portion (43), including a bypass valve portion (43), including a bypass valve piston (113) connected in parallel across the fan motor (41), and operable to permit fluid flow from the inlet passage (83) to the outlet passage (91) at a flow rate which is at least a portion of X. The bypass valve piston (113) is biased toward the bypass position by the fluid pressure in the inlet passage (83), and is biased toward the closed position by fluid pressure in a signal chamber (115). Fluid communication between the signal chamber (115) and the outlet passage (91), and therefore, the fluid pressure in the signal chamber (115), is controlled by a pilot valve assembly (127), including a poppet valve member (151), which is biased toward a closed position by the force of an electromagnetic coil (139).

11 Claims, 8 Drawing Figures

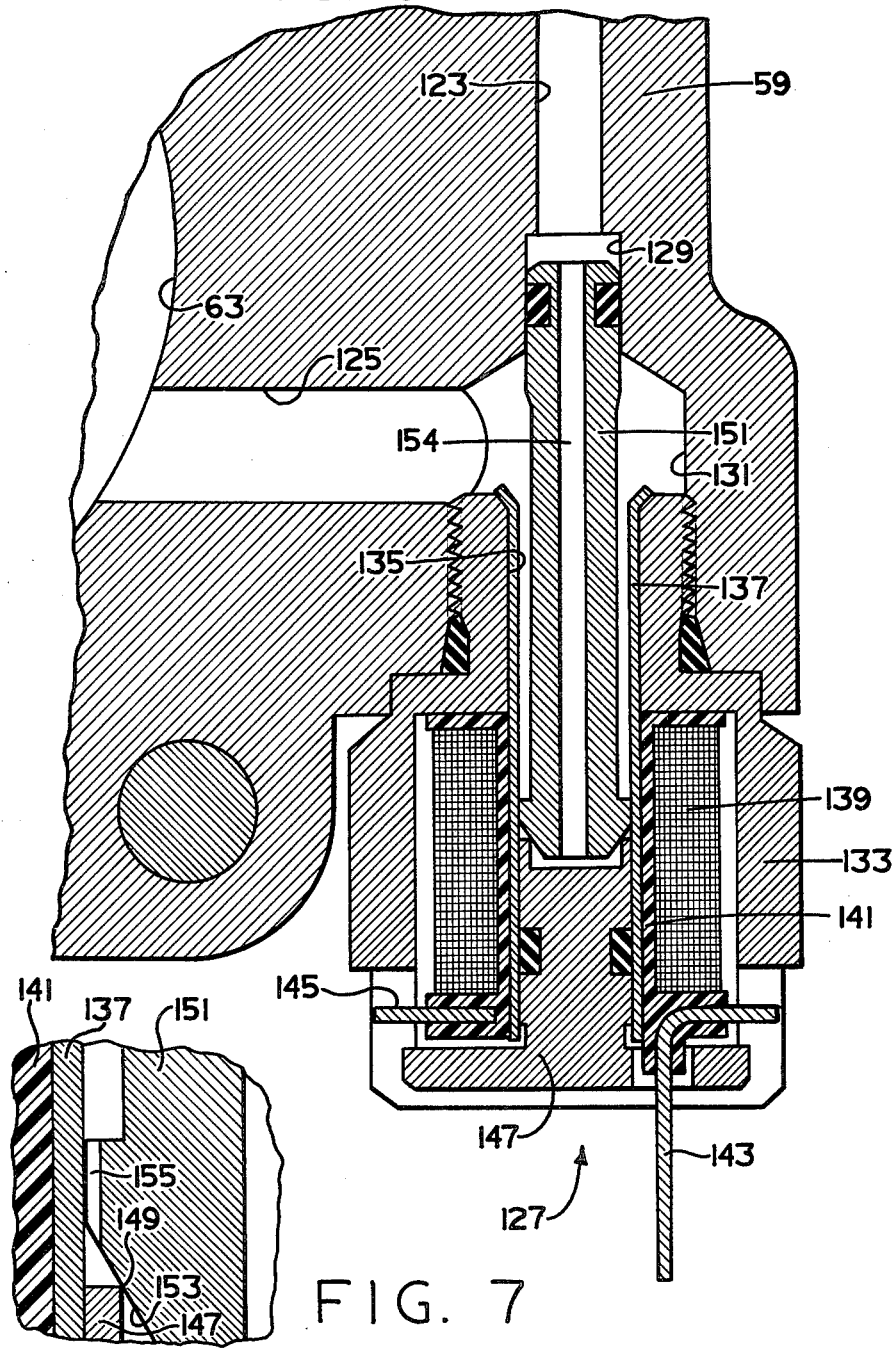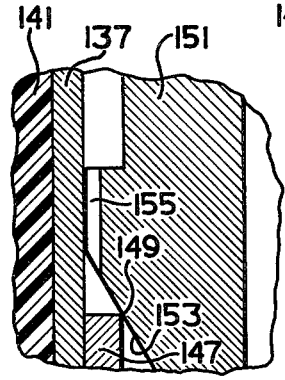

MOTOR-VALVE APPARATUS FOR HYDRAULIC FAN DRIVE SYSTEM

CROSS REFERENCE TO RELATED APPLICATIONS

The present application is a continuation in part of of application Ser. No. 907,064, filed May 18, 1978.

BACKGROUND OF THE DISCLOSURE

The present invention relates to hydraulic systems for driving the radiator cooling fans of vehicle engines, and more particularly, to an improved motor-valve apparatus for use in such fan drive systems.

Although it will become apparent from the subsequent description that the present invention has many uses and applications, it is especially advantageous when used to drive the radiator cooling fan of a vehicle engine, and will be described in connection therewith.

Originally, radiator cooling fans were driven directly, i.e., by some form of mechanical connection between the fan and the engine crankshaft. For example, the fan was frequently bolted to a flange on a shaft projecting forwardly from the engine water pump, such that the fan speed was either the same as the engine speed, or directly proportional thereto, depending upon the belt and pulley ratios between the crankshaft and the water pump. The proportionality between fan speed and engine speed is desirable at lower engine speeds (e.g., below 3000 rpm), but is undesirable at higher speeds where additional air flow through the radiator becomes unnecessary, wastes engine horsepower and creates excessive noise.

More recently, viscous fan drives have been developed which overcome the above-mentioned problems whereby direct fan drive systems have excessive fan speed at higher engine speeds. Viscous fan drives transmit torque by means of a viscous fluid contained within a shear space defined between an input member and an output member, such that rotation of the input member causes a viscous shear drag to be exerted on the output member, transmitting torque thereto. See U.S. Pat. No. 2,948,268, assigned to the assignee of the present invention. Viscous fan drives of the type shown in the cited patent have an inherent torque-limiting characteristic, such that the fan speed increases roughly proportional to the engine speed, up to a certain engine speed such as 2500 rpm, then the fan speed levels off and remains constant as engine speed and torque continue to rise. The resulting graph of fan speed versus engine speed has become known as a "viscous curve", and it is now generally a requirement of U.S. vehicle manufacturers that any drive system, whether of the viscous type or not, operate in accordance with the well-known "viscous curve".

A further step in the development of viscous fan drives was represented by U.S. Pat. No. 3,055,473, which discloses a viscous fan drive having the same "viscous curve" during its normal operation condition (engaged), but in addition, has the ability to become disengaged in response to ambient air temperature being below a predetermined level, thus providing a substantial saving of engine horsepower when normal operation of the fan is unnecessary for sufficient cooling of the engine.

Both of the conventional fan drive arrangements discussed above can be used only with a standard in-line engine, i.e., one having the crankshaft oriented axially. However, in recent years many auto makers, especially in Europe, have elected to use a transverse engine, providing front wheel drive, for reasons which are now well known in the art, and the trend toward transverse engines, especially in the four and six cylinder range, is extending to the U.S. as well. In European transverse engine automobiles, the cooling requirements have generally been met rather easily for various reasons, including the fact that the majority of the vehicles have been used in the generally colder regions, such as the Scandinavian countries. However, the nature of the U.S. automobile market is such that all transverse engine vehicles marketed in the U.S. will be required to have sufficient cooling capacity to operate satisfactorily under the conditions prevailing in the hot southern regions of the country.

A major approach to the cooling of transverse engines is the use of hydraulic systems, including a hydraulic pump driven by the engine and a hydraulic motor connected to the fan. It will be appreciated by those skilled in the art of automotive engines and engine accessories that the addition of a complete hydraulic system creates problems relating to space requirements, and undesirably increases both the weight and cost of the vehicle. Accordingly, those attempting to design a satisfactory hydraulic fan drive system have tried to reduce the space, weight, and cost of such systems by utilizing at least one of the hydraulic components in at least two different vehicle hydraulic systems. For example, there have been frequent attempts to utilize the power steering pump to provide pressurized fluid to operate a hydraulic fan motor, as well as the power steering gear (see U.S. Pat. No. 2,777,287). In such systems, inter-action between the fan motor and the other hydraulic actuator (such as the power steering gear) have generally resulted in unsatisfactory performance by the fan motor, or the steering gear, or both.

One design approach to such systems has been to place the fan motor in series with the power steering gear, but upstream therefrom, such that the flow through the fan motor also passes through the steering gear. See U.S. Pat. No. 3,659,567. A major drawback of such prior art systems has been a constant flow rate through the fan motor over all engine speeds from idle to maximum, such that fan speed is constant regardless of engine speed. Typically, the result with such a system is that more cooling than is needed is provided at lower engine speeds, thereby wasting engine horsepower, or the cooling may be only marginal at higher engine speeds, or both. In addition, such systems require a relatively high fan motor pressure and pump horsepower at lower engine speeds when the pressure drop across the power steering gear is greatest, thus making it difficult to satisfy the pressure and flow requirement of both the fan and steering system simultaneously.

In parent application Ser. No. 907,064, the embodiment of the motor-valve apparatus illustrated therein includes a temperature responsive bypass valve which might be termed "mechanical position sensitive". By that it is meant that the operating characteristics of the bypass valve are largely determined by the setting of the mechanical connection between the bypass valve and the temperature responsive device, i.e., the power pill. Partially as a result of the mechanical connection to the temperature responsive device, a preliminary adjustment of the position of the bypass valve is required, and although the bypass valve may be set to operate satisfactorily at a given flow rate, it may not be fully satisfactory at other flow rates.

SUMMARY OF THE INVENTION

Accordingly, it is an object of the present invention to provide an improved motor-valve apparatus for a hydraulic fan drive system in which the operation of the bypass valve is not "mechanical position sensitve".

It is a related object of the present invention to provide a motor-valve apparatus in which the bypass valve is responsive to changes in a signal pressure, which is controlled by a pilot valve assembly.

The above and other objects of the present invention are accomplished by the provision of an improved motor-valve apparatus for use in a hydraulic fan drive system. The system includes a pump having a fluid outlet port, a fluid inlet port, and a pumping element operable to deliver fluid at a rate proportional to engine speed. The pump comprises the sole source of pressurized fluid for the system and includes flow control valve means operable to limit the fluid delivery rate of the pump to X at higher engine speeds. The motor-valve apparatus comprises housing means and a positive displacement, fluid pressure actuated rotary device disposed within the housing means. The housing means defines a fluid pressure port and a fluid return port communicating with the expanding and contracting fluid chambers, respectively, of the rotary device. The housing means defines an inlet passage, an outlet passage, and a bypass passage communicating therebetween, the inlet passage permitting communication between the inlet port and the pressure port, and the outlet passage providing communication between the return port and the outlet port. Bypass valve means is disposed in the inlet passage and includes a bypass valve member movable between a first position preventing communication from the inlet passage to the bypass passage, and a second position permitting fluid flow from the inlet passage to the bypass passage at a flow rate which is at least a major portion of X. The valve member is biased toward the second position by fluid pressure in the inlet passage and is biased toward the first position by fluid pressure in a signal chamber. The valve means includes means communicating pressurized fluid into the signal chamber. A pilot valve means is operable in response to changes in a predetermined condition between a first position blocking fluid communication between the signal chamber and the outlet passage, and a second position permitting fluid communication from the signal chamber to the outlet passage.

BRIEF DESCRIPTION OF THE DRAWINGS

FIG. 6 is a fragmentary cross section, similar to FIG. 4, on a larger scale.

FIG. 7 is a fragmentary cross section, similar to FIG. 6, on a substantially larger scale.

DESCRIPTION OF THE PREFERRED EMBODIMENTS

System

Figure 1:
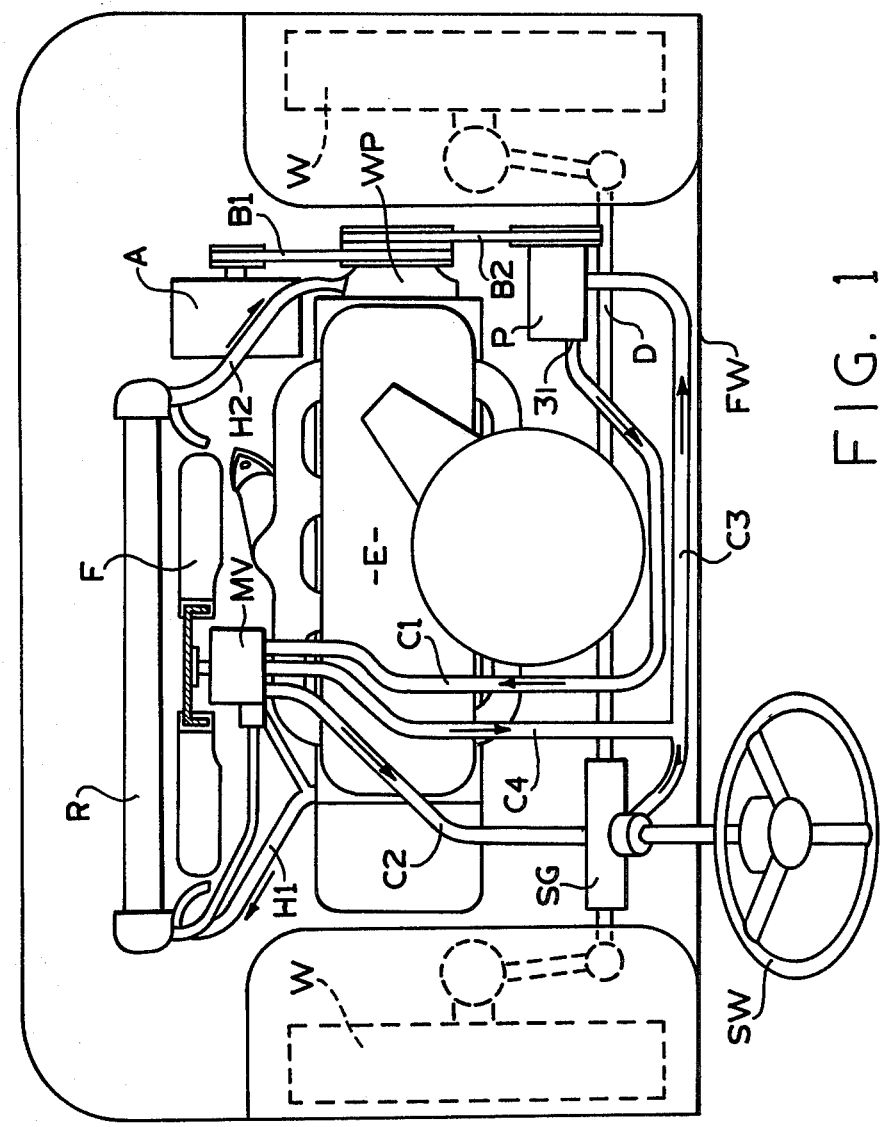
FIG. 1 is a somewhat schematic top plan view of the engine compartment of a vehicle utilizing a hydraulic fan drive system in accordance with the present invention.

Referring now to the drawings, which are not intended to limit the invention, FIG. 1 is a somewhat schematic top plan view of the engine compartment of a vehicle utilizing the present invention. Transversely disposed within the compartment is a vehicle engine E including means (not shown) for transmitting torque to a pair of ground-engaging front wheels W. Disposed adjacent the right-hand end of the engine E, and driven thereby, is a water pump WP including a pair of pulleys, one of which drives a V-belt B1, which drives the alternator A, and the other of which drives a V-belt B2 which drives a power steering pump P. As is well known in the art, the power steering pump is driven at a speed having a certain, fixed relationship to engine speed, depending upon the ratio of the pulleys which are interconnected by the belt B2.

Disposed adjacent the forward portion of the vehicle engine compartment is a radiator R. A hose H1 communicates relatively hot water from the engine E to the top tank of the radiator R, while a second hose H2 communicates relatively cooler water from the radiator bottom tank to the engine water pump WP.

Situated in its normal location, just ahead of a fire wall FW is an open-center, hydraulic booster-type steering gear mechanism SG of the type commonly used, which is responsive to the rotation of a steering wheel SW to transmit a steering force to a drag link D.

The power steering pump P generates a flow of pressurized fluid which is communicated by means of a conduit C1 to a motor-valve apparatus MV, to which is operably attached a radiator cooling fan F. Some of the fluid leaving the motor-valve apparatus MV is communicated by conduit C2 to the open-center steering gear mechanism SG, and from the steering gear SG back to the pump P by means of a conduit C3. Alternatively, as will be described in greater detail subsequently, fluid may flow from the motor-valve apparatus MV by means of a conduit C4 which bypasses the steering gear SG and communicates with the conduit C3.

As is well known in the art of power steering pumps, a bypass flow control arrangement is commonly used and provides an output flow from a discharge port 31 of the pump P which is directly proportional to engine speed, and pump input speed, up to a predetermined flow rate, at which point the flow rate from the discharge port 31 levels off and remains constant as engine speed continues to rise.

Figure 2:
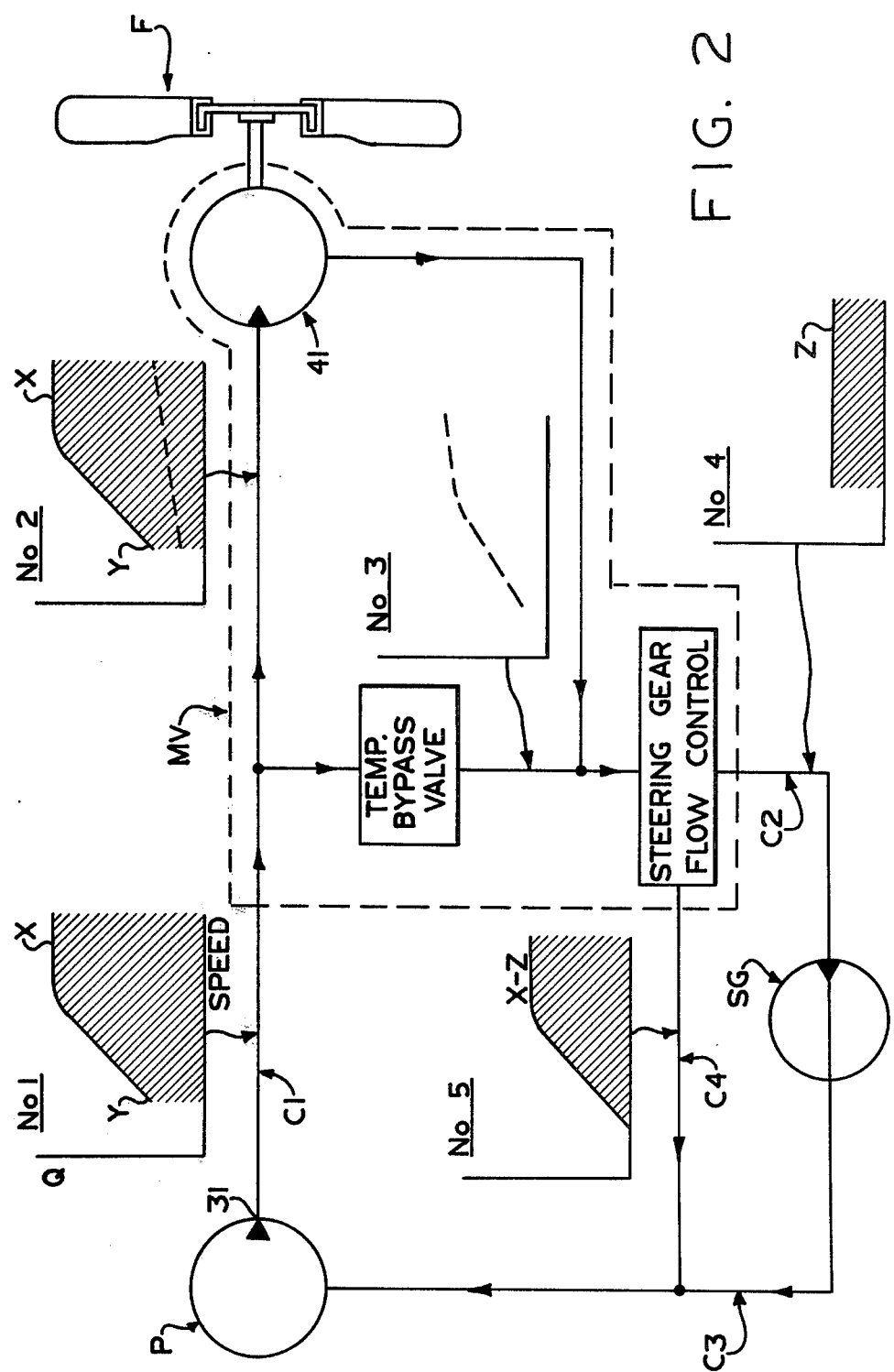
FIG. 2 is a hydraulic schematic of a fan drive system of the type with which the present invention may be utilized.

The above-described flow control feature is illustrated graphically in FIG. 2, which is a hydraulic schematic of a fan drive system with which the present invention may be used. In order to provide a better understanding of the invention, various portions of the schematic of FIG. 2 have associated therewith a graph of flow versus speed (either engine or pump input). It should be noted that the graphs do not include numbers, indicating specific flow quantities or specific speeds, but are intended merely to indicate relative flow quantities for purposes of describing the invention schematically and conceptually. However, it should also be noted that the graphs cover what will be referred to hereinafter as the "range of operating engine speeds", i.e., speeds ranging from approximately engine idle up to an engine speed corresponding to a typical vehicle cruising speed, such as 55 mph.

Referring still to FIG. 2, it may be seen in graph No. 1 that the power steering pump P, which is the sole source of pressurized fluid for the system, delivers fluid through the conduit C1 to the motor-valve apparatus MV at a rate of Y at engine idle. The flow rate through the conduit C1 increases generally proportional to input speed until a flow rate of X occurs, and as engine speed increases further, all fluid in excess of X is recirculated internally within the pump P. As may be seen in graph No. 1, the flow rate X is substantially greater than the flow rate Y.

Pressurized fluid entering in the motor-valve apparatus MV flows through one of two alternative flow paths. When operation of the radiator cooling fan F is required, substantially all of the fluid entering the motor-valve apparatus MV flows through the fan motor, generally designated 41, as is illustrated by the solid line in graph No. 2. In this condition, the fan motor 41 is referred to as being "engaged", and practically no fluid passes through the temperature responsive bypass valve, as is illustrated by the lack of a solid line in graph No. 3.

Although the flow into the fan motor 41, in the engaged condition, is shown in graph No. 2 as substantially identical to the pump output shown in graph No. 1, it should be understood that such a relationship is not an essential feature of the present invention. Thus, the flow through the motor 41 could be somewhat less than the flow rate of X, although normally it would be desirable to utilize the full pump output to drive the motor 41, thereby minimizing the pressure drop needed to achieve a desired fan drive horsepower.

When very little cooling is required, and it is sufficient for the fan motor 41 to turn the fan F at a relatively low speed, the fan motor 41 is referred to as being "disengaged", as is illustrated by the dashed flow curves in graphs No. 2 and No. 3. From graph No. 2 it may be seen that a certain quantity of fluid will be permitted to drive the fan motor 41, while the remainder of the fluid flows through the temperature responsive bypass valve, bypassing the motor 41. It should be understood that the relationship or flow through the motor 41 (in the disengaged condition) and the input speed is not limited to that shown in graph No. 2, which is by way of example only, but may vary somewhat depending upon the set points of the system.

The outlet flow from the fan motor 41 and the bypass flow, if any, recombine within the motor-valve apparatus MV and flow into a steering gear flow control, such that regardless of the need for cooling, the input to the steering gear flow control may be represented by a flow curve substantially as in graph No. 1.

The purpose of the steering gear flow control is to provide to the steering gear mechanism SG the required quantity of fluid. As is well known to those skilled in the art, the conventional automotive steering gear mechanism is of the open-center type such that the steering gear is designed to have a generally constant flow rate therethrough, with the fluid pressure being dependent upon the steering load. One of the reasons for the conventional steering gears being open-center is the desire to use a fixed displacement power steering pump, the least expensive type of pump. However, as will be understood by those skilled in the hydraulics art, the inclusion of the steering gear flow control in the present invention effectively makes the overall system open-center, even if a closed-center steering gear were substituted for the conventional open-center steering gear. Therefore, it is within the scope of the present invention to use a steering gear mechanism SG which is not open-center, in which case, the steering gear flow control directs fluid to the steering gear SG only in response to a "demand" for fluid. Accordingly, the system preferably includes a steering gear flow control capable of communicating a fluid flow rate of approximately Z (graph No. 4) to the steering gear mechanism SG over the entire range of operating engine speeds, the flow rate Z being substantially less than the flow rate X.

The steering gear flow control is operable to communicate substantially all of the inlet fluid flow in excess of Z (graph No. 5) through the conduit C4 to bypass the steering gear SG and recombine with the fluid leaving the steering gear by means of the conduit C3. Downstream of the junction of the conduits C3 and C4, the flow returning to the inlet of the power steering pump P is substantially identical to the flow being discharged from the pump P. It may also be seen that the present invention makes it possible to drive a hydraulic fan motor and operate a hydraulic steering gear mechanism in series, using a conventional power steering pump (with a modified flow control setting), with each of the fan motor and the steering gear receiving the quantity of fluid appropriate for its operation, independent of the other.

Motor-Valve Apparatus

Referring now to FIGS. 3–6, a preferred embodiment of the motor-valve apparatus MV will be described in detail. As may best be seen in FIG. 3, the motor-valve apparatus MV includes the fan motor 41 and a valve portion 43, held together by a plurality of threaded members 45. The fan motor 41 comprises a front cover member 47 and, disposed between the cover member 47 and the valve portion 43, a gerotor gear set 49. The gerotor gear set 49 includes an externally toothed inner rotor 51, ecentrically disposed within an internally toothed outer rotor 53. As is well known in the art of gerotor gear sets, the inner rotor 51, has one less tooth than the outer rotor 53, such that the toothed engagement of the rotors 51 and 53 defines a plurality of fluid volume chambers 57. It should be understood that the use of a gerotor gear set in the motor 41 is not an essential feature of the present invention. However, it is preferred that the motor comprise a positive displacement device, operable to translate a flow of pressurized fluid into a rotary output, and that the device define expanding and contracting fluid volume chambers. Examples of other types of devices which may be used herein are internal and external gear, sliding vane, radial piston or ball, and axial piston or ball.

Figure 3:
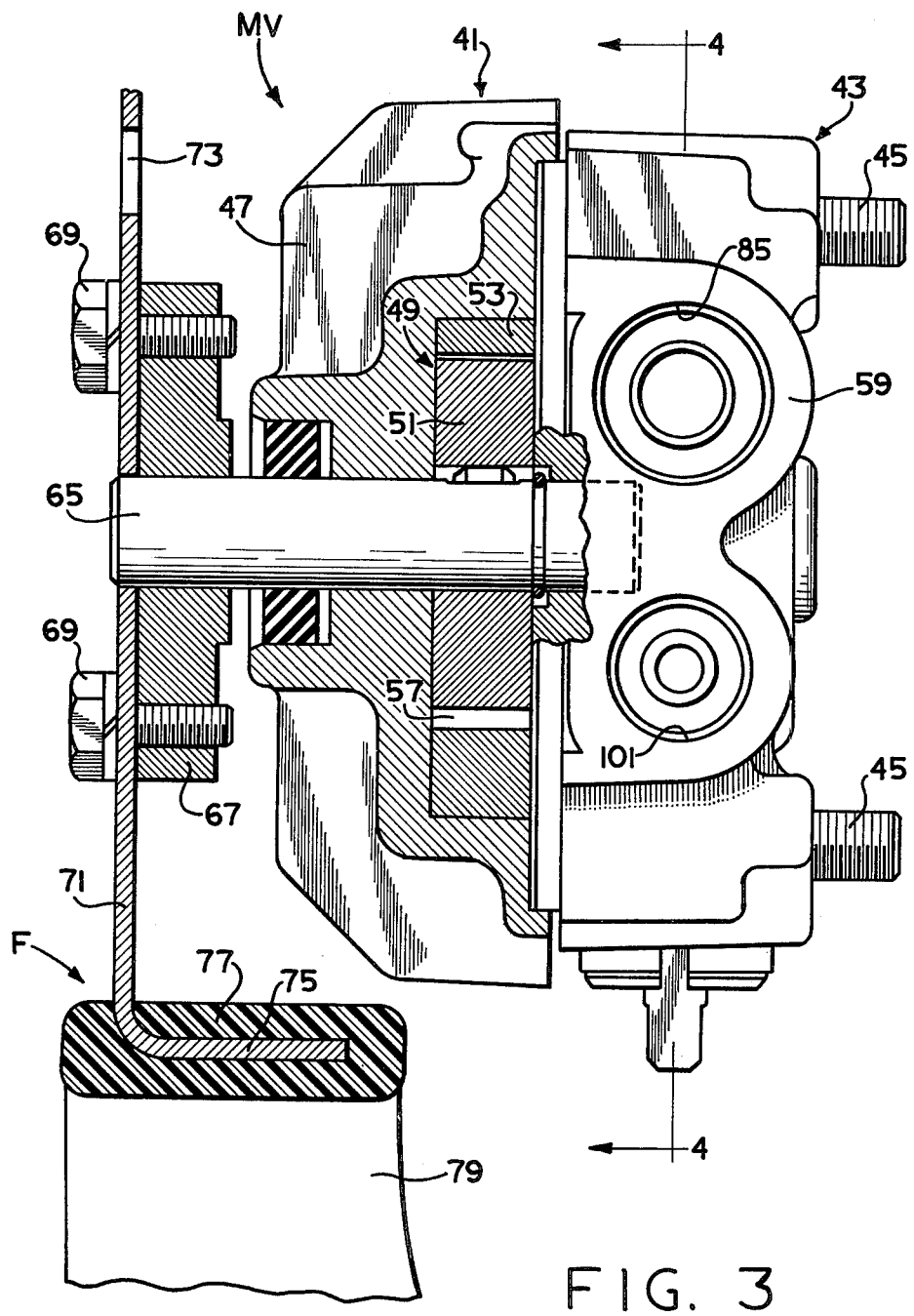
FIG. 3 is a view, partly in elevation, and partly in cross section, of the motor-valve apparatus of the present invention.
Figure 4:
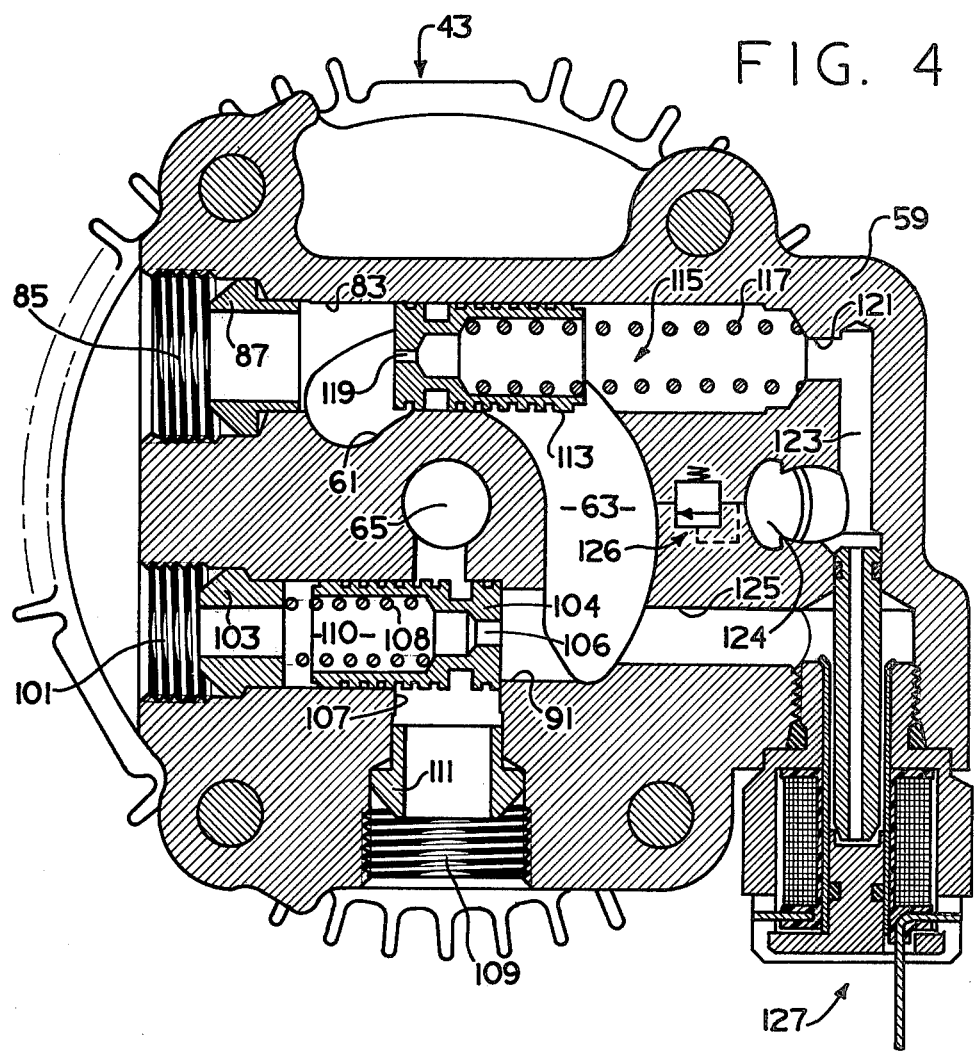
FIG. 4 is a transverse cross section taken on line 4—4 of FIG. 3.

The valve portion 43 includes a housing 59 defining an inlet kidney port 61 and an outlet kidney port 63 (refer now also to FIG. 4). As will be further described subsequently, pressurized fluid from the inlet kidney port 61 is communicated to the volume chambers which are expanding, thereby turning the inner rotor 51, while fluid in the volume chambers which are contracting is discharged into the outlet kidney port 63. The inner rotor 51 is keyed to an output shaft 65 which drivingly engages a backup plate 67 (FIG. 3).

The radiator cooling fan F, the specific design of which forms no part of the present invention, is shown in FIG. 3 as a combination plastic and metal fan assembly. Attached to the backup plate 67 by a plurality of bolts 69 is a metal spider 71, including a plurality of openings 73 through which incoming air is permitted to flow. The metal spider includes an annular outer portion 75 embedded within, and surrounded by a hub portion 77 of a plastic fan, the plastic fan including a plurality of fan blades 79 extending radially from the hub 77.

Referring now to FIG. 4, which is a transverse cross section through the valve portion 43, the construction and operation of a preferred embodiment of the valve portion 43 will be described in detail. The housing 59 defines an inlet passage 83 having, at its left end in FIG. 4, a threaded inlet port 85. Disposed within the inlet passage 83 is a deformable fitting member 87 which sealingly engages a fitting (not shown) at the end of the conduit C1, when the fitting is threaded into the inlet port 85. The inlet passage 83 communicates with the inlet kidney port 61 to communicate pressurized inlet fluid from the pump P to the expanding volume chambers as described previously.

The housing 59 also defines an outlet passage 91 which, at its left end in FIG. 4, defines a primary outlet port 101. Disposed within the outlet passage 91 is a deformable fitting 103 which sealingly engages a fitting (not shown) attached to the upstream end of the conduit C2, when the fitting is threaded into the primary outlet port 101. A secondary passage 107 communicates with the outlet passage 91 and defines a secondary outlet port 109. Disposed within the passage 107 is a deformable fitting 111 which sealingly engages a fitting (not shown) attached to the upstream end of the conduit C4, when the fitting is threaded into the secondary outlet port 109.

It may be seen that substantially all of the fluid entering the inlet port 85, whether it flows through the fan motor 41 or through the bypass passage 93, eventually enters the outlet passage 91. Disposed within the outlet passage 91 is the steering gear flow control (shown schematically in FIG. 2), which includes a second bypass piston 104. The bypass piston 104 defines an orifice 106 which permits fluid flow from the outlet passage 91 to the primary outlet port 101, as was described in connection with FIG. 2. The bypass piston 104 is biased to the left by the fluid pressure in the outlet passage 91, and is biased to the right by the combined force of a biasing spring 108 and the fluid pressure within a pressure chamber 110. It is believed that the principle of operation of the type of flow control arrangement disclosed herein is sufficiently well known to those skilled in the art to eliminate the necessity for a detailed description, especially in view of the description in parent application Ser. No. 907,064.

Figure 5:
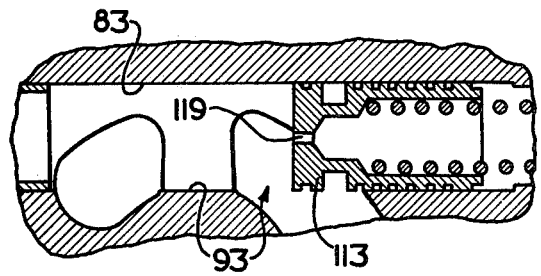
FIG. 5 is a fragmentary view similar to FIG. 4, in a different operating condition.

As may best be seen in FIG. 5, the housing 59 also defines a bypass passage 93 which, in the subject embodiment, comprises a portion of the bore forming the inlet passage 83. It may be seen in FIGS. 4 and 5 that the outlet kidney port 63, in addition to receiving discharge fluid from the contracting volume chambers, provides fluid communication between the bypass passage 93 and the outlet passage 91. Therefore, for purposes of the subsequent description and claims, the term "bypass passage" will be understood to refer to, and include, both the passage 93 and the portion of the kidney port 63, axially disposed from the gerotor gear set 49.

Disposed within the bore defining the inlet passage 83 and bypass passage 93 is a temperature responsive bypass valve piston 113, which cooperates with the bore to define a signal chamber 115. The bypass piston 113 is biased toward a first position (FIG. 4) by a spring 117, and by the fluid pressure within the signal chamber 115. In the first position, the bypass piston 113 prevents fluid communication from the inlet passage 83 to the bypass passage 93, thus forcing substantially all of the fluid entering the inlet port 85 to pass through the inlet kidney port 61, and through the gerotor gear set 49. Thus, for any given fluid flow rate into the inlet port 85, the speed of the fan motor 41 will be at a maximum when the bypass piston 113 is in the first position.

The bypass piston 113 is biased toward a second position (FIG. 5) by the fluid pressure within the inlet passage 83. With the bypass piston 113 in the second position, fluid flow is permitted from the inlet passage to the bypass passage 93 at a flow rate which is at least a major portion of the flow rate X, which was described previously in connection with graph No. 3 in FIG. 2. Thus, for any given flow rate into the inlet port 85, the speed of the fan motor 41 is at a minimum when the bypass piston 113 is in the second position.

It will be appreciated by those skilled in the art that the first and second positions illustrated in FIGS. 4 and 5 are somewhat exaggerated, for ease of illustration, and that the actual amount of travel of the bypass piston 113, between the first and second positions, would normally be substantially less than that indicated by FIGS. 4 and 5. The bypass piston 113 defines an orifice 119 which provides restricted fluid communication from the inlet passage 83 to the signal chamber 115. It is believed that the selection of the appropriate size for the orifice 119 would be obvious to those skilled in the art from a reading and understanding of the remainder of the specification.

Referring still to FIG. 4, the housing 59 defines a passage providing relatively unrestricted fluid communication with the signal chamber 115, and a passage 123, providing relatively unrestricted fluid communication with the passage 121. In addition, the housing 59 defines a passage 125 which provides relatively unrestricted fluid communication with the outlet kidney port 63 (and the bypass passage), and thus, with the outlet passage 91, although the passage 125 could communicate directly with the secondary passage 107.

In threaded engagement with the housing 59, and associated with the passages 123 and 125, is a pilot valve assembly, generally designated 127, which will be described in greater detail subsequently, in connection with FIGS. 6 and 7. Referring still to FIG. 4, the function of the pilot valve assembly 127 is to control the fluid communication between the passage 123 and the passage 125. For example, if the pilot valve assembly 127 prevents fluid communication from the passage 123 to the passage 125, pressurized fluid in the inlet passage 83 blows through the orifice 119, with the result that the fluid pressure is the same in the signal chamber 115 as in the inlet passage 83, and the spring 117 biases the bypass piston 113 to the first position (FIG. 4). If, on the other hand, the pilot valve assembly 127 permits sufficient fluid communication from the passage 123 to the passage 125 (e.g., from about 0.01 gpm to about 0.1 gpm), the fluid pressure in the signal chamber 115 will be less than that in the inlet passage 83, and the pressure in the inlet passage 83 will overcome the biasing force of the spring 117 and bias the bypass piston 113 to the second position (FIG. 5), permitting fluid flow from the inlet passage to the bypass passage. Therefore, the bypass piston 113 is not "position sensitive", as in parent application Ser. No. 907,064, but is "signal pressure" sensitive. As a result, there is no need for mechanical presetting of the piston 113, and no concern about the tolerances of mechanical connectors, threaded members, etc., or the overall "tolerance stack".

One of the advantages of the present invention is related to the fact that the pressure drop across the bypass piston 113 is equal to the force of the spring 117. Because the fluid pressure in the signal chamber 115 is substantially equal to the pressure in the outlet kidney port 63 when the pilot valve 127 is "open", the force of the spring 117 effectively determines the pressure drop across the fan motor 41, and therefore, the minimum or "disengaged" fan speed (graph No. 3 in FIG. 2).

In fluid communication with the passage 123 is an angled passageway 124, and a pressure relief valve 126, shown schematically in fluid communication with the outlet kidney port 63, although it could also communicate with the passage 125. The function of the relief valve 126 may be twofold: first, as a safety feature, it serves to relieve fluid pressure and prevent damage to the apparatus in the event of motor seizure. Secondly, because it communicates with the signal chamber 115, the relief setting of the valve 126 is effective to determine the maximum pressure drop across the fan motor 41, and therefore, the maximum fan speed.

Pilot Valve Assembly

Referring now to FIG. 6, the pilot valve assembly 127 will be described in greater detail. The passage 123 opens into a slightly enlarged bore 129 which, in turn, opens into a substantially enlarged bore 131, which communicates with the passage 125. A portion of the bore 131 defines a set of internal threads which provide for threaded engagement between the pilot valve assembly 127 and the housing 59. The pilot valve assembly 127 includes an annular housing 133 which, in the subject embodiment, is made of a ferro-magnetic material. The housing 133 includes a relatively larger lower portion, and a relatively smaller upper portion defining an inside diameter 135. Disposed in engagement with the inside diameter 135 is an elongated tubular member 137, which is non-magnetic for reasons which will become apparent.

The larger, lower portion of the housing 133 and the tubular member 137 cooperate to define an annular chamber within which is disposed an electromagnetic coil 139, wound on a plastic spool 141. Partially encapsulated within the spool 141 is a pair of terminals 143 and 145 which provide electrical connections for the coil 139.

Disposed partially within the lower portion of the tubular member 137 is a seat member 147 which, in the subject embodiment, is made of a ferro-magnetic material. As may best be seen in FIG. 7, the seat member 147 terminates, at its upper end, in an annular valve seat 149. Also disposed within the tubular member 137 is an elongated poppet member 151, having its upper end portion in sealing engagement with the bore 129 to prevent leakage therebetween, from the passage 123 to the passage 125. The poppet member 151 terminates, at its lower end, in a frusto-conical poppet surface 153, and defines an axial passage 154, providing fluid communication from the passage 123 to the lower surface of the poppet member 151. It will be appreciated by those skilled in the art that the area of the lower surface of poppet member 151 (including the portion of surface 153 inside the seat 149) must be slightly greater than the upper surface of the member 151, such that the pressurized fluid exerts a net upward biasing force.

With a voltage imposed across the terminals 143 and 145, energizing the electromagnetic coil 139, an electromagnetic field is generated, with the resulting lines of flux passing through the lower portion of the annular housing 133, the seat member 147, and the poppet member 151. Therefore, with the coil 139 energized, the resulting electromagnetic force on the poppet member 151 holds the poppet surface 153 in sealing engagement with the annular valve seat 149. Because energization of the coil 139 causes the poppet surface 153 to sealingly engage the valve seat 149, and prevent fluid communication from the passage 123 to the passage 125, the embodiment of the invention shown in FIGS. 6 and 7 is referred to as being of the "coil-on, fan-on" type.

Referring now to FIG. 7, it may be seen that the enlarged portion of the poppet member 151, adjacent the surface 153, and which may engage the inside diameter of the tubular member 137, defines one or more axial grooves or notches 155 although any form of clearance between members 151 and 137 is sufficient. When the coil 139 is de-energized, fluid pressure acting on the poppet member 151, biasing it upwardly, opens an orifice between the seat 149 and the surface 153. Fluid is then permitted to flow from the passage 123, downward through the axial passage 154 in the poppet member 151, through the orifice between seat 149 and surface 153, then upwardly through the notches 155 and into the passage 125.

A major advantage of the FIG. 6 embodiment is that it results in a desirable "match" of the "pressure drop vs. area" characteristics of the poppet member and the "force vs. distance" effect of the coil 139 on the poppet member 151. By way of further explanation, as the poppet surface 153 moves closer to the valve seat 149, thus reducing the orifice area therebetween, the pressure drop across the orifice increases, thereby increasing the net upward biasing force acting on the poppet 151. At the same time, however, as the poppet member 151 moves closer to the valve seat 149, the gap between the seat 149 and the member 151 is reduced, such that there is an increasing attractive force on the poppet member 151, approximately balancing the increasing upward hydraulic force.

The coil-on, fan-on embodiment of FIG. 6 does have one possible drawback, however. In the event of a failure in the electrical system, or any other defect which results in the inability to energize the coil 139, the bypass piston 113 will remain in the second position (FIG. 5) resulting in very low fan speed, even under temperature conditions indicating a need for maximum cooling, and maximum fan speed.

Figure 8:
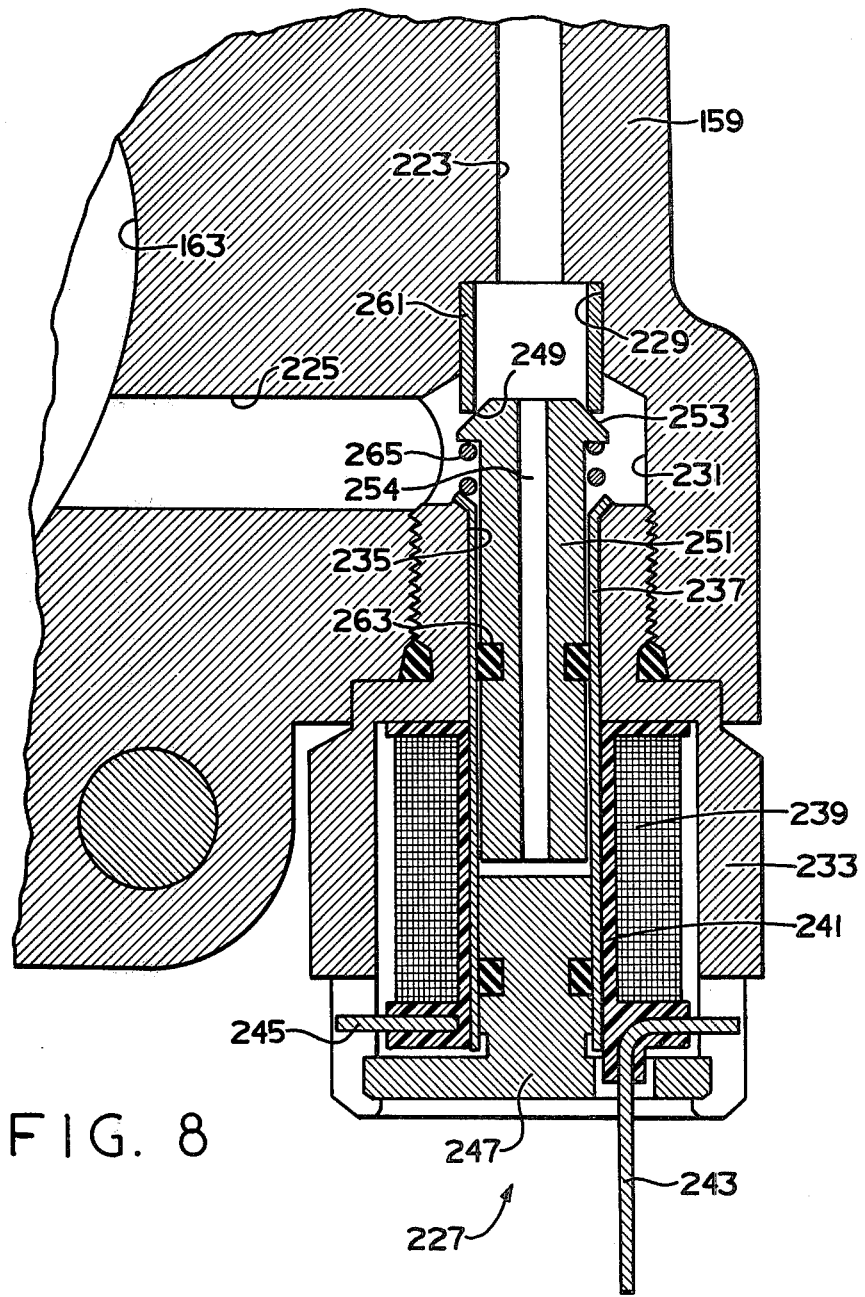
FIG. 8 is a fragmentary cross section, similar to FIG. 6, illustrating an alternative embodiment of the present invention.

Referring now to FIG. 8, there is illustrated an alternative embodiment of the pilot valve assembly, with like elements bearing like numerals, plus 100, and new elements bearing numerals above 260. The pilot valve assembly 227 includes the annular housing 233 in threaded engagement with the main housing 159, with the elongated tubular member 237 cooperating with the housing 233 to define the annular chamber within which is disposed the electromagnetic coil 239, wound on the plastic spool 241. Connected to the coil 239 is the pair of terminals 243 and 245.

Disposed partially within the lower portion of the tubular member 237 is a member 247, which, in the FIG. 8 embodiment, is not used to define a valve seat. Instead, disposed within the slightly enlarged bore 229 is a tubular member 261 which defines, at its lower end, the valve seat 249. Disposed within the member 237 is the elongated poppet member 251 which terminates, at its upper end, in the frusto-conical poppet surface 253, and defines the axial passage 254. Intermediate its opposite ends, the poppet member 251 includes a sealing member 263, which seals against the inside diameter of the tubular member 237 to prevent leakage therebetween, from the passage 223 to the passage 225.

The poppet member 251 is biased upwardly, as seen in FIG. 8, by a compression spring 265 to maintain the poppet surface 253 in sealing engagement with the valve seat 249, when the electromagnetic coil 239 is de-energized. Thus, the embodiment shown in FIG. 8 is of the "coil-off, fan-on" type (or "coil-on, fan-off"). It may be seen in FIG. 8 that energization of the coil 239 will bias the poppet member 251 downwardly, in opposition to the biasing force of the spring 265, thereby moving the poppet surface 253 out of sealing engagement with the seat 249, and permitting fluid to flow from the passage 223 to the passage 225.

It should also be apparent to those skilled in the art that the embodiment of FIG. 8 will be just the opposite of the embodiment of FIG. 6 in regard to the advantage and disadvantage discussed above in connection with the FIG. 6 embodiment. That is, in the FIG. 8 embodiment, there is not the "match" of the "pressure drop vs. area" characteristics and the "force vs. distance" characteristics. However, the FIG. 8 embodiment does have the advantage that in the event of an electrical failure or inability to energize the coil 239, the poppet member 251 will remain biased to the closed (seated) position, such that the by-pass piston 113 will remain in its first position (FIG. 4), and the fan will continue to operate at maximum speed, for any given input flow rate. It should also be noted that the pilot valve assemblies 127 and 227 are interchangeable, without the need for substantial modification of the rest of the motor-valve apparatus MV.

Although the pilot valve assemblies 127 and 227 have been described herein as being electrically actuated, it should be apparent to those skilled in the art that actuation of the poppet member may be accomplished by other means, such as a power pill. Thus, it is an important feature of the present invention that the use of a bypass valve, responsive to signal pressure, permits the use of a temperature-responsive mechanism having a relatively lower output capability, or lower power requirement.

In addition, although the preferred embodiments were described as being of the "on-off" type, it is a feature of the invention that the pilot valve approach makes the apparatus easily adaptable to some form of modulation, so that the change from fan "off" to fan "on" (or vice versa) is gradual, over a range of temperatures, rather than being abrupt, or some intermediate fan speed can be maintained in response to a temperature within such a range.

In regard to the preferred embodiments being described as the "on-off" type, it should also be noted that the poppet member within the pilot valve could perform its function by "oscillating" between the on and off positions at some frequency, for example, in response to a pulse-width-modulated input signal, the duty cycle of which would vary with changes in the temperature.

Although the system is disclosed herein as including a fixed displacement pump, it should be apparent to those skilled in the art that a variable displacement pump, or a load sensing pump, could be used instead, without changing the significance of the present invention. It is intended that reference in the appended claims to the pumping element being "operable to deliver fluid at a rate proportional to engine speed" include both fixed and variable displacement pumps, as long as they are positive displacement.

Finally, although the present invention has been described in connection with an apparatus in which the motor and valve are integral, partially to simplify plumbing, it should be apparent that the motor and valve could be integral with another element of the system, such as the pump, without changing the function of the motor or valve.

What is claimed is:

1. Motor-valve apparatus for use in a hydraulic fan drive system including a pump having a fluid outlet port, a fluid inlet port, and a pumping element operable to deliver fluid at a rate proportional to engine speed, the pump comprising the sole source of pressurized fluid for the system and including flow control valve means operable to limit the fluid delivery rate of the pump to X at higher engine speeds, said motor-valve apparatus comprising:
   (a) housing means defining an inlet port for connection to the outlet port of the pump and further defining at least one outlet port, said one outlet port being in fluid communication with the inlet port of the pump;
   (b) a positive displacement, fluid pressure actuated rotary device operably disposed within said housing means, said device being adapted to transmit torque to a fan, and defining expanding and contracting fluid chambers;
   (c) said housing means defining a fluid pressure port and a fluid return port communicating with said expanding and contracting fluid chambers respectively;
   (d) said housing means defining an inlet passage, an outlet passage, and a bypass passage communicating between said inlet and outlet passage, said inlet passage permitting fluid communication between said inlet port and said pressure port, and said outlet passage providing fluid communication between said return port and said outlet port;
   (e) bypass valve means disposed in one of said inlet passage and said bypass passage and including a bypass valve member movable between a first position substantially preventing fluid communication from said inlet passage to said bypass passage, and a second position permitting fluid flow from said inlet passage to said bypass passage at a flow rate which is at least a major portion of X, the bypass flow through said bypass passage and the return flow through said return port being recombined in said outlet passage;
   (f) said valve member being biased toward said second position by fluid pressure in said inlet passage;
   (g) said valve means or said housing means and said valve means defining a signal chamber, said valve member being biased toward said first position by fluid pressure in said signal chamber;

(h) means communicating pressurized fluid into said signal chamber; and (i) pilot valve means operable in response to changes in a predetermined condition between a first position blocking fluid communication between said signal chamber and said outlet passage, and a second position permitting fluid communication from said signal chamber to said outlet passage.

2. Motor-valve apparatus as claimed in claim 1 wherein said bypass valve member defines an orifice permitting restricted fluid communication from said inlet passage to said signal chamber.

3. Motor-valve apparatus as claimed in claim 1 including spring means disposed in said signal chamber biasing said valve member toward said first position.

4. Motor-valve apparatus as claimed in claim 1 wherein said pilot valve means includes a poppet member movable, in response to changes in a predetermined temperature condition, between said first and second positions.

5. Motor-valve apparatus as claimed in claim 4 wherein said pilot valve means includes electromagnetic coil means operable to exert varying biasing forces on said poppet member in response to varying electrical inputs.

6. Motor-valve apparatus as claimed in claim 4 wherein the position of said poppet member is infinitely variable between said first and second positions corresponding to changes in said predetermined temperature conditions between a first temperature condition and a second temperature condition.

7. Motor-valve apparatus as claimed in claim 5 wherein said poppet member is biased toward said first position by said electromagnetic coil means when said coil means is energized.

8. Motor-valve apparatus as claimed in claim 5 wherein said poppet member is biased toward said second position by said electromagnetic coil means when said coil means is energized.

9. Motor-valve apparatus for use in a hydraulic fan drive system including a pump having fluid inlet and outlet ports and a pumping element operable to deliver fluid at a rate proportional to engine speed, the pump having a fluid delivery rate of Y at engine idle, the pump comprising the sole source of pressurized fluid for the system and including flow control valve means operable to limit the fluid delivery rate of the pump to X at higher engine speeds, X being substantially greater than Y, the system further including an open-center steering gear mechanism having inlet and outlet ports, the outlet port of the steering gear mechanism being in fluid communication with the inlet port of the pump, the steering gear mechanism being adapted to receive a fluid flow rate of Z over substantially the entire range of operating engine speeds, X being substantially greater than Z, said motor-valve apparatus comprising:

(a) housing means defining an inlet port, a primary outlet port for connection to the inlet port of the steering gear mechanism, and a secondary outlet port for connection to the inlet port of the pump;

(b) a positive displacement, fluid pressure actuated rotary device operably disposed within said housing means, said device being adapted to drive a fan, and defining expanding and contracting fluid chambers, said device having a displacement operable to provide a desired fan speed, at engine idle, corresponding to a fluid flow rate of approximately Y, and a peak fan speed corresponding to a fluid flow rate of approximately X;

(c) said housing means defining a fluid pressure port and a fluid return port communicating with said expanding and contracting fluid chambers respectively;

(d) said housing means defining an inlet passage, an outlet passage and a bypass passage communicating between said inlet and outlet passages, said inlet passage providing fluid communication between said inlet port and said pressure port, and said outlet passage providing fluid communication between said return port and said primary and secondary outlets;

(e) bypass valve means disposed in fluid communication with said inlet passage and including a bypass valve member movable between a first position substantially preventing fluid communication from said inlet passage to said bypass passage, and a second position permitting fluid flow from said inlet passage to said bypass passage at a flow rate which is at least a major portion of X, the bypass flow through said bypass passage and the return flow through said return port being recombined in said outlet passage;

(f) said valve member being biased toward said second position by fluid pressure in said inlet passage;

(g) said valve member and said housing means cooperating to define a signal chamber, said valve member being biased toward said first position by fluid pressure in said signal chamber;

(h) means communicating pressurized fluid into said signal chamber; and (i) pilot valve means operable in response to changes in a predetermined condition between a first position blocking fluid communication between said signal chamber and said outlet passage, and a second position permitting fluid communication from said signal chamber to said outlet passage.

10. Motor-valve apparatus as claimed in claim 9 including flow control valve means disposed in said outlet passage and being operable to maintain a fluid flow rate of Z from said outlet passage to said primary outlet port over substantially the entire range of operating engine speeds and to communicate substantially all fluid flow in excess of Z from said outlet passage to said secondary outlet port.

11. Motor-valve apparatus for use in a hydraulic fan drive system including a pump having a fluid outlet port, a fluid inlet port, and a pumping element comprising the sole source of pressurized fluid for the system, the system further including an auxiliary fluid pressure operated device having inlet and outlet ports, the outlet port of the auxiliary device being in fluid communication with the inlet port of the pump, the auxiliary device being adapted to receive a fluid flow rate of Z over substantially the entire range of operating engine speeds, a fluid flow rate of X being communicated to said motor-valve apparatus at relatively higher engine speeds, X being substantially greater than Z, said motor valve apparatus comprising:

(a) housing means defining an inlet port for connection to the outlet port of the pump, a first outlet port for connection to the inlet port of the auxiliary device, and a second outlet port for connection to the inlet port of the pump;

(b) a positive displacement, fluid pressure actuated rotary device operably disposed within said housing means, said device being adapted to transmit torque to a fan, and defining expanding and contracting fluid chambers;

(c) said housing means defining a fluid pressure port and a fluid return port communicating with said expanding and contracting fluid chambers respectively;

(d) said housing means defining an inlet passage, an outlet passage and a bypass passage communicating between said inlet and outlet passages, said inlet passage providing fluid communication between said inlet port and said pressure port, and said outlet passage providing fluid communication between said return port and said first and second outlet ports;

(e) bypass valve means disposed in fluid communication with said inlet passage and including a bypass valve member movable between a first position substantially preventing fluid communication from said inlet passage to said bypass passage, and a second position permitting fluid flow from said inlet passage to said bypass passage at a flow rate which is at least a major portion of X, the bypass flow through said bypass passage and the return flow through said return port being recombined in said outlet passage;

(f) said valve member being biased toward said second position by fluid pressure in said inlet passage;

(g) said valve member and said housing means cooperating to define a signal chamber, said valve member being biased toward said first position by fluid pressure in said signal chamber;

(h) means communicating pressurized fluid into said signal chamber; and (i) pilot valve means operable in response to changes in a predetermined condition between a first position blocking fluid communication between said signal chamber and said outlet passage, and a second position permitting fluid communication from said signal chamber to said outlet passage.

* * * * *